(12) United States Patent
Mabuchi

(10) Patent No.: US 11,223,178 B2
(45) Date of Patent: Jan. 11, 2022

(54) TERMINAL DISPLACEMENT AMOUNT DETECTION METHOD, TERMINAL INSERTION METHOD, TERMINAL DISPLACEMENT AMOUNT DETECTION DEVICE, AND TERMINAL INSERTION DEVICE

(71) Applicant: Yazaki Corporation, Tokyo (JP)

(72) Inventor: Miyoshi Mabuchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 134 days.

(21) Appl. No.: 16/668,365

(22) Filed: Oct. 30, 2019

(65) Prior Publication Data

US 2020/0067253 A1   Feb. 27, 2020

Related U.S. Application Data

(63) Continuation of application No. PCT/JP2018/009882, filed on Mar. 14, 2018.

(30) Foreign Application Priority Data

Jun. 6, 2017 (JP) .............................. JP2017-111656

(51) Int. Cl.
*H01R 43/20* (2006.01)
*G01D 5/34* (2006.01)

(52) U.S. Cl.
CPC ............. *H01R 43/20* (2013.01); *G01D 5/341* (2013.01)

(58) Field of Classification Search
CPC ................................ G01D 5/341; H01R 43/20
See application file for complete search history.

(56) References Cited

FOREIGN PATENT DOCUMENTS

| CN | 101783475 B | * | 9/2012 |
| JP | 4132180 A | * | 5/1992 |
| JP | 2010-003432 A | | 1/2010 |

* cited by examiner

*Primary Examiner* — Carl J Arbes
(74) *Attorney, Agent, or Firm* — Sughrue Mion, PLLC

(57) ABSTRACT

A method includes a moving step of moving linearly a holder holding parallel to one another in a single row a plurality of connector terminals while measuring a movement distance of the holder with a tip of each of the plurality of connector terminals pointing in a traveling direction, a passage detection step of detecting passage of the tip of each of the plurality of connector terminals at a target point on a path, the target point coinciding with each other in a side view when the path of each of the plurality of connector terminals is viewed in an arrangement direction of the plurality of connector terminals, and a displacement amount acquiring step of acquiring a displacement amount between the tips of the plurality of connector terminals based on the movement distance when the passage is detected for the tip of each of the plurality of connector terminals.

10 Claims, 9 Drawing Sheets

TERMINAL DISPLACEMENT AMOUNT
DETECTION METHOD, TERMINAL
INSERTION METHOD, TERMINAL
DISPLACEMENT AMOUNT DETECTION
DEVICE, AND TERMINAL INSERTION
DEVICE

BACKGROUND OF THE INVENTION

Field of the Invention

The present invention relates to a terminal displacement amount detection method for detecting a displacement between tips of terminals of a plurality of connector terminals crimped and connected to an end of an electrical wire, and a terminal insertion method for insertion of a plurality of connector terminals based on the displacement thus acquired. The present invention also relates to a terminal displacement amount detection device used in the above-described terminal displacement amount detection method, and a terminal insertion device used in the above-described terminal insertion method.

Description of the Related Art

Conventionally, for transmission of high frequency signals, a twist cable in which a plurality of electrical wires is combined or a twist shield cable in which a twist electrical wire is further shielded is used. Then, work is often performed to insert a plurality of connector terminals crimp-connected to ends of the plurality of electrical wires forming such a cable, into a plurality of terminal accommodation chambers in a connector housing. At this time, in order to insert the connector terminal into the terminal accommodating chamber one to one, untwisting the twist or removing the shield member for free routing of the connector terminal in the vicinity of the connector housing, an excess length of the wire to be released may be long in some cases. If such excess length becomes long, there is a possibility that the shielding effect may be reduced.

Therefore, a technology has been proposed in which a plurality of connector terminals is collectively held in a jig and simultaneously inserted into a plurality of terminal accommodation chambers in that state (for example, see Patent Literature 1). According to this technology, since it is not necessary to arrange the connector terminals individually when inserting into the terminal accommodating chamber, the excess length of the electrical wire as described above can be suppressed.

CITATION LIST

Patent Literature

Patent Literature 1: JP 2010-3432 A

SUMMARY OF THE INVENTION

However, in the technology of Patent Literature 1, there is a possibility that tips of the plurality of connector terminals may be simultaneously inserted into the plurality of terminal accommodation chambers in a state where the tips are displaced from each other. For example, when the tip of any connector terminal is largely displaced to the rear in the insertion direction than the tip of the other connector terminal, the insertion of the displaced connector terminal into the terminal accommodating chamber may be insufficient.

For this reason, there is a need for a technology that can grasp a displacement amount between the tips of the plurality of connector terminals before insertion.

Therefore, the present invention pays attention to the problems as described above, and aims at providing a terminal displacement amount detection method, a terminal insertion method, and a terminal displacement amount detection device, and a terminal insertion device capable of grasping a displacement amount between tips before inserting for a plurality of connector terminals.

In order to solve the above problems, the terminal displacement amount detection method of the present invention includes the steps of: a moving step of moving linearly a holder holding parallel to one another in a single row a plurality of connector terminals each of which is crimped and connected to an end portion of an electrical wire while measuring a movement distance of the holder with a tip of each of the plurality of connector terminals pointing in a traveling direction; a passage detection step of detecting passage of the tip of each of the plurality of connector terminals at a target point on a path, the target point coinciding with each other in a side view when the path of each of the plurality of connector terminals is viewed in an arrangement direction of the plurality of connector terminals; and a displacement amount acquiring step of acquiring a displacement amount between the tips of the plurality of connector terminals based on the movement distance when the passage is detected for the tip of each of the plurality of connector terminals.

Further, in order to solve the above problems, the terminal insertion method of the present invention includes the steps of: a moving step of moving linearly a holder holding parallel to one another in a single row a plurality of connector terminals each of which is crimped and connected to an end portion of an electrical wire while measuring a movement distance of the holder with a tip of each of the plurality of connector terminals pointing in a traveling direction; a passage detection step of detecting passage of the tip of each of the plurality of connector terminals at a target point on a path, the target point coinciding with each other in a side view when the path of each of the plurality of connector terminals is viewed in an arrangement direction of the plurality of connector terminals; a displacement amount acquiring step of acquiring a displacement amount between the tips of the plurality of connector terminals based on the movement distance when the passage is detected for the tip of each of the plurality of connector terminals; and an insertion step of further moving linearly the holder when the displacement amount is less than a predetermined threshold so as to simultaneously insert the plurality of connector terminals into a plurality of terminal accommodation chambers of the connector housing, the connector housing being disposed such that the plurality of terminal accommodation chambers is positioned one to one along the path of each of the plurality of connector terminals.

Further, in order to solve the above problems, the terminal displacement amount detection device of the present invention is provided with a holder for arranging and holding parallel to one another in a single row a plurality of connector terminals, each crimped and connected to an end portion of the electrical wire, a moving part for moving linearly the holder with tips of the plurality of connector terminals pointing in a traveling direction; a distance measuring unit for measuring a movement distance of the holder in the traveling direction, a passage detection unit for detecting passage of the tip of each of the plurality of connector terminals at a target point on a path, the target point coinciding with each other in a side view when the path of each of the plurality of connector terminals is viewed in an arrangement direction of the plurality of connector terminals; and a displacement amount acquisition unit for acquiring a displacement amount between the tips of the plurality of connector terminals based on the movement distance when the passage is detected for the tip of each of the plurality of connector terminals.

In order to solve the above-mentioned subject, terminal insertion device of the present invention includes a holder for arranging and holding parallel to one another in a single row a plurality of connector terminals, each crimped and connected to an end portion of the electrical wire, a moving part for moving linearly the holder with tips of the plurality of connector terminals pointing in a traveling direction; a distance measuring unit for measuring a movement distance of the holder in the traveling direction, a passage detection unit for detecting passage of the tip of each of the plurality of connector terminals at a target point on a path, the target point coinciding with each other in a side view when the path of each of the plurality of connector terminals is viewed in an arrangement direction of the plurality of connector terminals; a housing holder for holding the connector housing such that the plurality of terminal accommodation chambers is positioned one to one along the path of each of the plurality of connector terminals; a displacement amount acquisition unit for acquiring a displacement amount between the tips of the plurality of connector terminals based on the movement distance when the passage is detected for the tip of each of the plurality of connector terminals; an information acquisition unit for acquiring information indicating that the displacement amount is less than a predetermined threshold value; and an insertion control unit for further moving linearly the holder to the moving part when receiving the acquisition in the information acquisition unit so as to simultaneously insert the plurality of connector terminals into the plurality of terminal accommodation chambers.

In the terminal displacement detection method of the present invention, based on the moving distance of the holder when passage of the target point is detected for each tip of the plurality of connector terminals, the displacement amount between tips of the plurality of connector terminals is acquired. Specifically, for example, the displacement amount can be acquired by calculating the difference in the movement distance when the passing of the target point is detected for each tip. The displacement amount may be acquired by calculation by an operator, or the measurement result of the movement distance may be configured to input to the computer, and be automatically calculated by the computer. Thus, according to the terminal displacement amount detection method of the present invention, the displacement amount between the tips of the plurality of connector terminals can be grasped before insertion.

Further, according to the terminal insertion method of the present invention, the displacement amount between the tips of the plurality of connector terminals can be grasped before insertion by the same method as the terminal displacement amount detection method of the present invention described above. Then, the connector terminal is inserted when the amount of displacement becomes smaller than a predetermined threshold value by correcting the holding state of the holder based on the amount of displacement thus grasped. Thus, the plurality of connector terminals can be sufficiently inserted into the plurality of terminal accommodation chambers.

Further, according to the terminal displacement amount detection device of the present invention, the displacement amount between the tips of the plurality of connector terminals is acquired at the displacement amount acquisition unit based on the movement distance of the holder when passage of the target point is detected for the tip of each of the plurality of connector terminals. The terminal displacement amount detection device according to the present invention may be an output unit that outputs the movement distance of the holder when passage of the target point is detected for the tip of each of the plurality of connector terminals, instead of the displacement amount acquisition unit. In this case, for example, the operator can acquire the displacement amount by calculating the difference between the output movement distances. In any case, according to the terminal displacement amount detection device of the present invention, the displacement amount between the tips can be grasped before insertion for the plurality of connector terminals.

According to the terminal insertion device of the present invention, with the same method as the terminal displacement amount detection device of the present invention described above, the displacement amount between the tips can be grasped before insertion for the plurality of connector terminals. Then, when information indicating that the amount of displacement has become less than a predetermined threshold is acquired as a result of correction of the holding state in the holder based on the amount of displacement thus grasped, the connector terminal is inserted. Thus, the plurality of connector terminals can be sufficiently inserted into the plurality of terminal accommodation chambers.

DETAILED DESCRIPTION OF THE PROFFERED EMBODIMENTS

Hereinafter, an embodiment of a terminal displacement amount detection method, a terminal insertion method, a terminal displacement amount detection device, and a terminal insertion device will be described.

Figure 1:
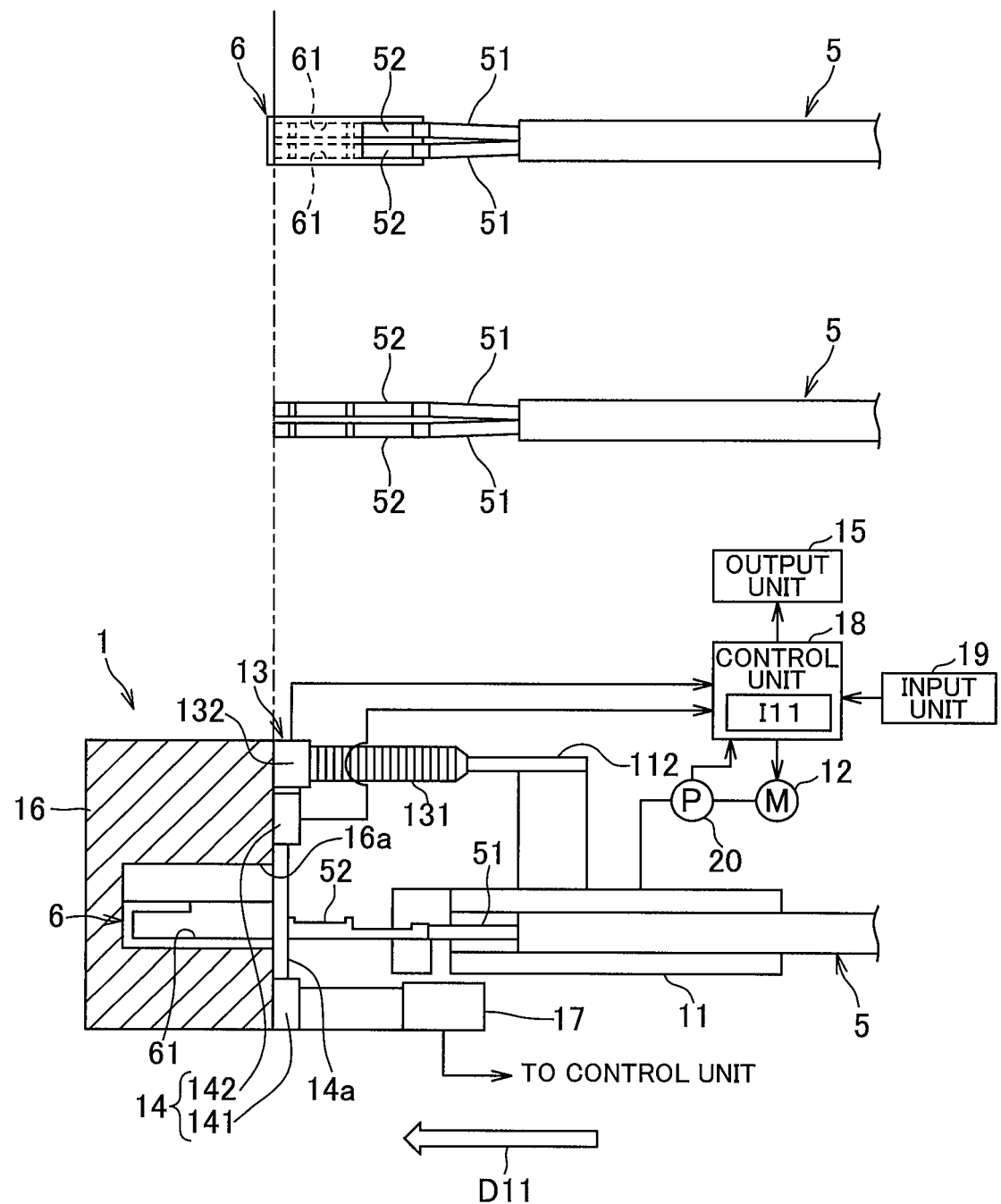
FIG. 1 is a view showing a terminal insertion device concerning one embodiment of the present invention.

FIG. 1 is a view showing a terminal insertion device according to an embodiment of the present invention.

A terminal insertion device 1 shown in FIG. 1 is a device simultaneously inserting two connector terminals 52 crimped to ends of the two electrical wires 51 in the two-core twisted cable 5 into two terminal accommodation chambers 61 in a connector housing 6. The terminal insertion device 1 includes a holder 11, a moving unit 12, a distance measuring unit 13, a passage detecting unit 14, an output unit 15, a housing holder 16, a wire color detecting unit 17, a control unit 18, an input unit 19, and a pressure measurement unit 20.

The holder 11 arranges and holds two connector terminals 52 in parallel to one another in a single row, each of which is crimped and connected to an end of the electrical wire 51. Then, the moving unit 12 causes the holder 11 to move the tip of each of the two connector terminals 52 linearly in a traveling direction D11. The moving unit 12 includes a motor driven under control of the control unit 18 and a mechanical unit converting a rotational driving force of the motor into a linear driving force of the holder 11. In the present embodiment, in response to an operation by the operator on the input unit 19, the control unit 18 causes the moving unit 12 to start the linear movement of the holder 11 (moving step). Stopping of the linearly movement is based on a determination of the control unit 18 described later.

Figure 2:
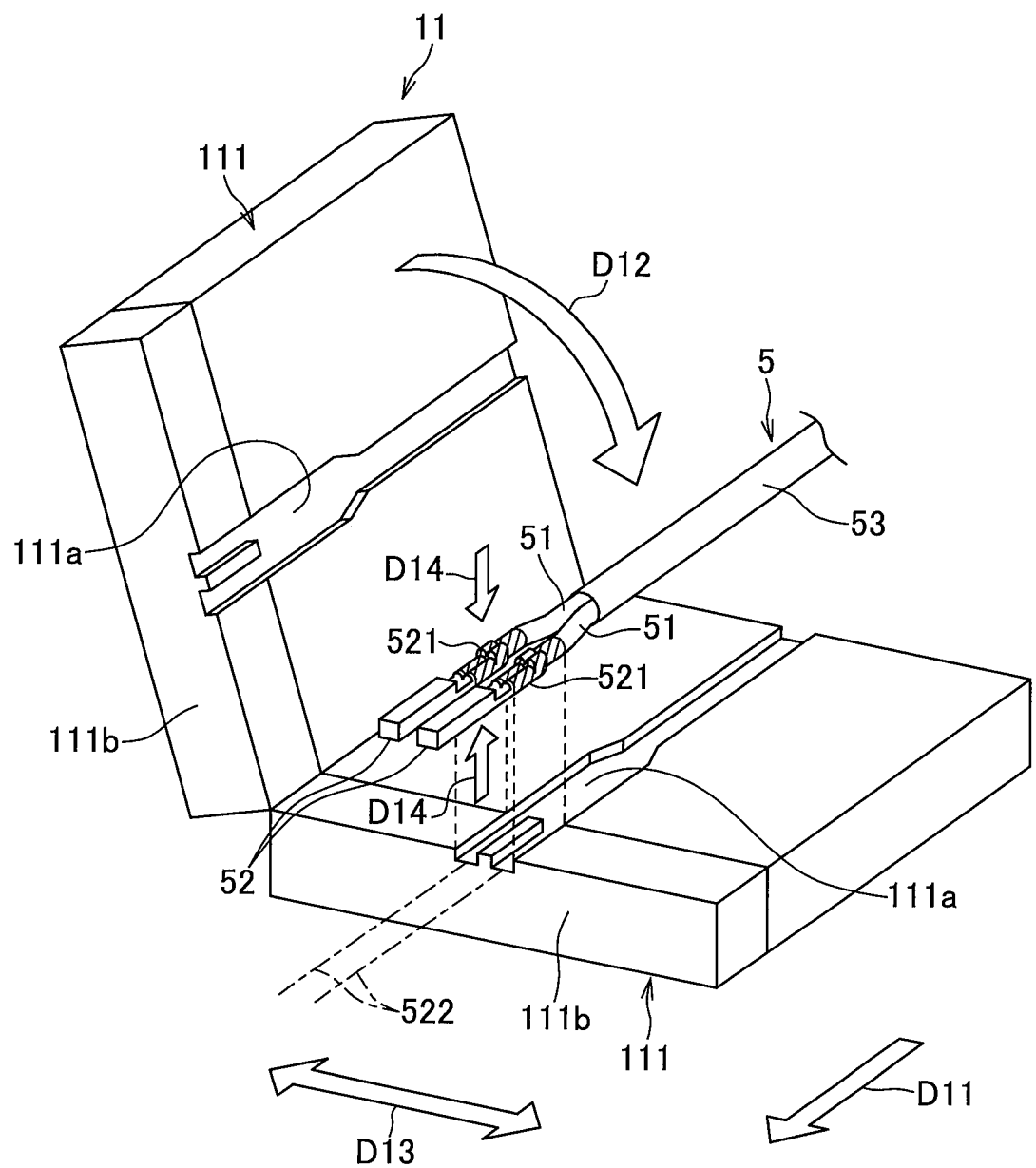
FIG. 2 is a view showing a holder shown by FIG. 1.

FIG. 2 is a view showing the holder shown in FIG. 1.

As shown in FIG. 2, the holder 11 is one in which two holding plates 111 each formed in a rectangular plate shape are hinge-connected at each side. Each holding plate 111 is formed with a holding groove 111a into which the two connector terminals 52 of the twist cable 5 are fitted. The outermost covering portion 53 in the connector terminal 52, the electrical wire 51, and the twist cable 5 are fitted into the holding groove 111a. In this state, when one holding plate 111 is closed in a direction of the arrow D12, the two connector terminals 52 are held in a state of being aligned in parallel in a row in the arrangement direction D13.

At this time, in the present embodiment, the holder 111 is provided with a clamping part 111b for clamping a crimping portion 521 crimped with the electrical wire 51 in each of the two connector terminals 52 with the electrical wire 51 located in the vicinity of the crimping portion 521. The clamping part 111b clamps the crimping portion 521 of each of the two connector terminals 52 and the electrical wire 51 in the vicinity thereof in a direction D14 crossing both a path 522 of each connector terminal 52 along the traveling D11 and an arrangement direction D13 of the connector terminals 52. As a result, the holder 111 can hold the connector terminal 52 in a more stable posture by suppressing rolling and the like. Further, in the present embodiment, the clamping part 111b is configured to be removable.

The distance measurement unit 13 shown in FIG. 1 is provided with a linear movement part 131 which is pushed in the traveling direction D11 by a distance measurement projection 112 provided on the holder 11 and moves linearly, and a receiving part 132 for holding slidably this linear movement part 131. In the present embodiment, Magnescale (registered trademark) using a magnetic detection principle is adopted as the distance measuring unit 13. In the distance measuring unit 13, a movement distance of the linear movement part 131 is output to the control unit 18 as the movement distance of the holder 11. In the moving step in which the holder 11 moves linearly, the distance measuring unit 13 measures the movement distance of the holder 11.

The passage detection unit 14 includes a light emitting unit 141 that emits the sensor light 14a and a light receiving unit 142 that receives the sensor light 14a.

Figure 3:
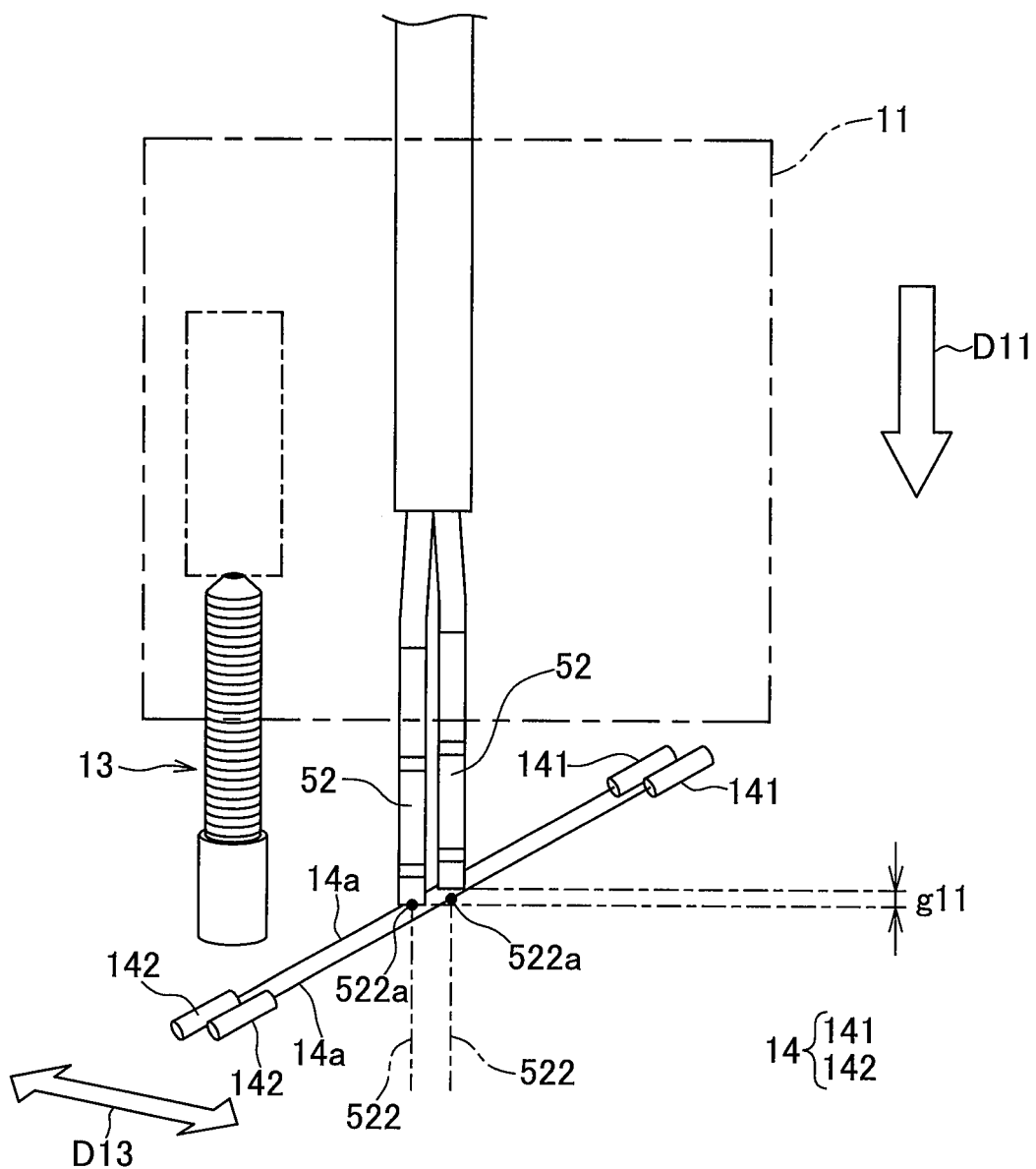
FIG. 3 is a view showing a displacement passage detection unit shown by FIG. 1.

FIG. 3 is a diagram showing the passage detection unit shown in FIG. 1.

As shown in FIG. 3, in the passage detection unit 14, two sets of the light emitting unit 141 and the light receiving unit 142 are disposed to pass through the target points 522a on the path 522 of each connector terminal 52. Here, the target point 522a in each path 522 is a point on the path 522 that matches each other in a side view when the two paths 522 are viewed in the arrangement direction D13 of the two connector terminals 52. The sensor light 14a emitted from the light emitting unit 141 of each set passes through the target point 522a and is received by the light receiving unit 142.

The holder 11 moves linearly directing a tip of each of the two connector terminals 52 in the traveling direction D11, and when the tip of each connector terminal 52 eventually reaches each target point 522a, the sensor light 14a is blocked by the tip. The passage detection unit 14 detects passage of the target point 522a at the tip of the corresponding connector terminal 52 when the sensor light 14a changes from a light reception state to a non-light reception state in the light receiving unit 141 in each set (passage detection step). The detection result is sent to the control unit 18 shown in FIG. 1.

On the other hand, in the distance measuring unit 13, the movement distance in the traveling direction D11 of the holder 11 holding the two connector terminals 52 is measured and sent to the control unit 18. In the present embodiment, the measurement result of the distance measurement unit 13 when the passage detection unit 14 detects the passage of the target point 522a for the tip of each of the two connector terminals 52 is output by the output unit 15 under the control of the control unit 18. In the present embodiment, the output unit 15 has a display screen, and the output unit 15 outputs and displays the measurement result of the distance measurement unit 13. Further, the control unit 18 stops the linear movement of the holder 11 by the moving unit 12 when the passage of the target point 522a at the tip end is detected for all the two connector terminals 52.

In the present embodiment, the control unit 18 determines a displacement amount g11 between the tips of each of the two connector terminals 52 based on the measurement result (movement distance) of each of the two connector terminals 52. The displacement amount g11 is acquired by calculating the difference in the movement distance when the passage of the target point 522a is detected for each tip (displacement amount acquisition step). The displacement amount g11 as the calculation result is output and displayed on the output unit 15 under the control of the control unit 18. Thus, based on the movement distance when the passage of the target point 522a is detected for the tip of each of the two connector terminals 52, the control unit 18 corresponds to an example of the displacement amount acquisition unit for acquiring the displacement amount between the tips of each of the two connector terminals 52.

Moreover, a wire color detection part 17 is provided in the terminal insertion device 1 of this embodiment, and the color of the wire 51 by which each of the two connector terminals 52 is crimp-connected is detected. The detection result is sent to the control unit 18, and the output unit 15 outputs and displays the measurement result of the distance measurement unit 13 together with the color of the corresponding electrical wire 51 under the control of the control unit 18. As a result, the operator can determine which connector terminal 52 crimped to the electrical wire 51 with any color of the two connector terminals 52 is displaced to the front side in the traveling direction D11.

A series of operations including the moving step of the holder 11, the passing detection step of the target point 522a at the tip of each connector terminal 52, and the displacement amount acquiring step for acquiring the displacement amount g11 corresponds to one example for the terminal displacement amount detecting method. Further, in the terminal insertion device 1 of the present embodiment, a combination of the holder 11, the moving unit 12, the distance measuring unit 13, the passage detecting unit 14, the output unit 15, the wire color detecting unit 17, the control unit 18 and the input unit 19 corresponds to an example of the terminal displacement amount detection device.

In the present embodiment, following the acquisition of the displacement amount g11 as described above, the control unit 18 compares the displacement amount g11 with a predetermined threshold to determine whether the displacement amount g11 is acceptable or not. As described above, in the present embodiment, the control unit 18 also corresponds to an example of the information acquisition unit that self-acquires the information I11 indicating that the displacement amount g11 is less than the threshold value based on the above determination.

Then, when the displacement amount g11 exceeds the threshold value, the moving unit 12 is operated in a reverse direction to lower the holder 11 to the initial position on the rear side in the traveling direction D11.

When the holder 11 is moved back to the initial position, the operator works correction in the holder 11 such that the connector terminal 52 displaced to the front side in the traveling direction D11 is moved back to the rear side. After the correction work, the input unit 19 is operated again to move the holder 11 linearly in the traveling direction D11. In this linear movement, the control unit 18 compares the above-described acquisition of the displacement amount with the threshold value. Such a series of operations is repeated until the displacement amount g11 becomes smaller than the threshold.

Then, when the displacement amount g11 is less than the threshold value, the connector terminal 52 is subsequently inserted into the terminal accommodating chamber 61 of the connector housing 6 under the control of the control unit 18.

In the terminal insertion device 1 shown in FIG. 1, a housing holder 16 for holding the connector housing 6 is provided. The housing holder 16 holds the connector housing 6 so that the two terminal accommodation chambers 61 are positioned one to one on the path 522 of each of the two connector terminals 52. And in this embodiment, the passage detection part 14 mentioned above is arranged in the vicinity of an insertion port 16a to each terminal accommodation chamber 61 in the housing holding part 16. For this reason, as described above, at the stage where the linear movement of the holder 11 is repeated and the displacement amount g11 becomes smaller than the threshold, the tips of the two connector terminals 52 reach the vicinity of the insertion port 16a to the respective terminal accommodating chambers 61 in the housing holder 16.

An insertion (insertion step) of the connector terminal 52 into the terminal accommodating chamber 61 of the connector housing 6 is performed such that the control unit 18 subsequently controls the moving unit 12 in this state to further move linearly the holder 11 in the traveling direction D11. This linear movement causes the two connector terminals 52 to be simultaneously inserted into the two terminal accommodation chambers 61. As described above, in the present embodiment, the control unit 18 also corresponds to an example of an insertion control unit that causes the moving unit 12 to further linearly move the holder 11 in response to an acquisition of the information I11 indicating that the displacement amount g11 is less than the threshold value, and two connector terminals 52 to simultaneously insert into the two terminal accommodation chambers 61.

Figure 4:
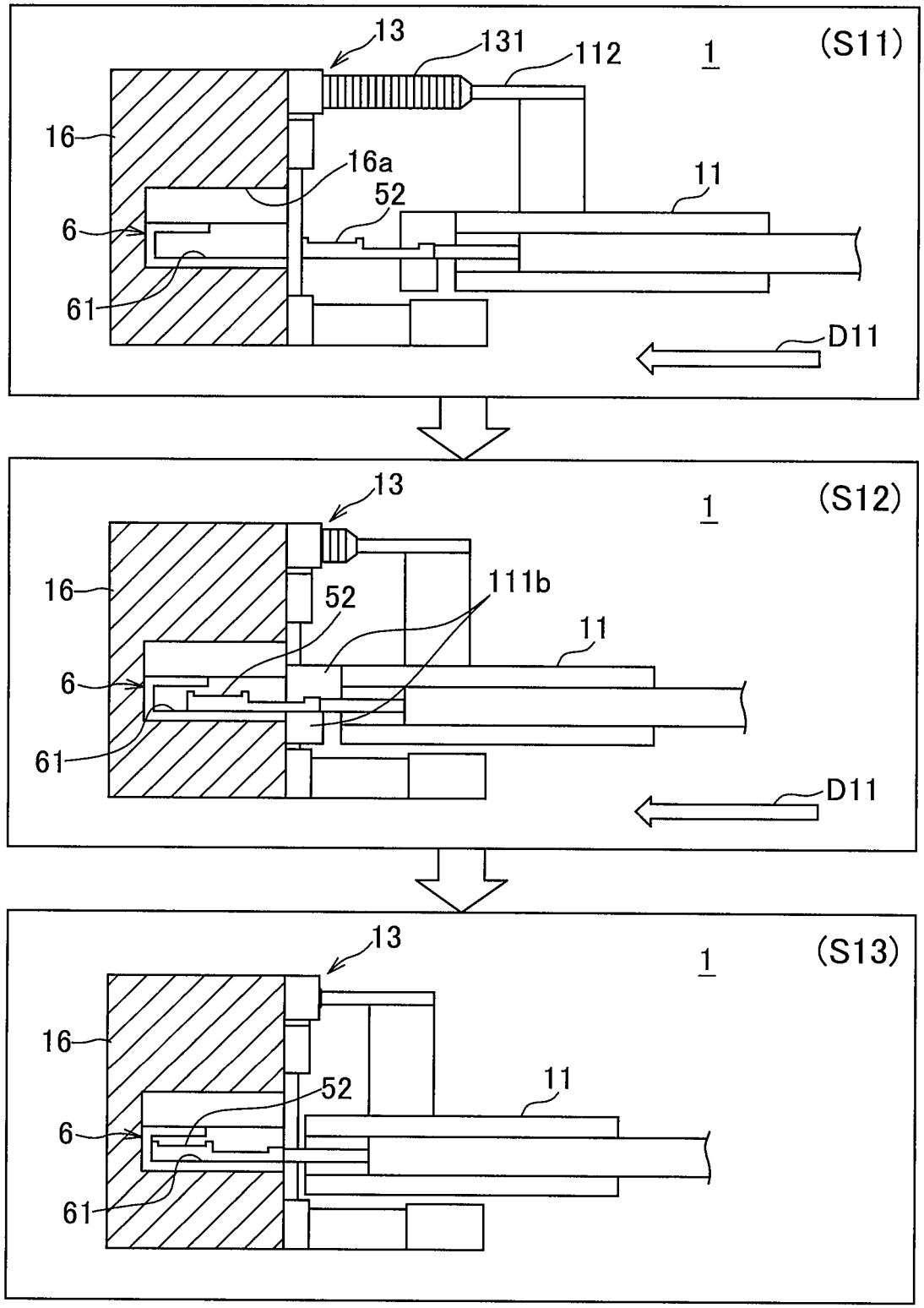
FIG. 4 is a view showing an insertion process of a connector terminal performed with the terminal insertion device shown by FIG. 1.

FIG. 4 is a view showing an insertion process of inserting the connector terminal performed by a terminal insertion device shown in FIG. 1.

At an initial stage (step S11) of this insertion step, as described above, the tips of the two connector terminals 52 are positioned in the vicinity of the insertion opening 16a at which the connector housing 6 is inserted into each of the connector accommodation chamber 61 in the housing holder 16. That is, of the two connector terminals 52, the tip of the preceding connector terminal 52 is located forward of the target point 522a by a displacement amount smaller than the above threshold value in the forward direction D11. The tip of the subsequent connector terminal 52 is located at the target point 522a. The holder 11 is stopped by the control of the control unit 18 in a state in which each of the tips of the two connector terminals 52 is positioned as described above. In step S11, when the control unit 18 acquires the above information I11, the control unit 18 first sets the measurement result of the distance measurement unit 13 at this time to zero. Then, under the control of the control unit 18, the holder 11 moves linearly in the traveling direction D11. At this time, the linearly movement part 131 of the distance measurement unit 13 is pushed in the traveling direction D11 by the distance measurement projection 112 provided in the holder 11, and the movement distance of the holder 11 is measured. The measurement result at this time is the movement distance of the holder 11 after the setting to zero by the control unit 18 as described above. The measurement result is sent to the control unit 18.

Further, when the holder 11 linearly moves in the traveling direction D11, the two connector terminals 52 simultaneously enter the two terminal accommodation chambers 61 of the connector housing 6 while the movement distance is measured by a distance measuring unit 13 (step S12). In the present embodiment, the linearly movement in step S12 is performed until the clamping part 111b, which is located on the front side in the traveling direction D11 in the holder 11, approaches the housing holder 16. The movement distance of the holder 11 until the holder 111b approaches is calculated in advance. The movement distance is a movement distance from the position of the holder 11 when the tips of the two connector terminals 52 are both located at the above-mentioned target point 522a to the approach of the clamping part 111b. The control unit 18 stops the movement of the holder 11 when the measurement result of the distance measurement unit 13 reaches the previously calculated movement distance. When the holder 11 is stopped, the operator removes the clamping unit 111b configured to be removable from the holder 11. Thereafter, the operator operates the input unit 19 to resume the movement of the holder 11.

The linearly movement of the holder 11 after the clamping part 111*b* is removed is performed under the control of the control unit 18 until a sufficient insertion completion distance to the insertion of all of the two connector terminals 52 into the two terminal accommodation chambers 61 is reached, which is acquired in advance by the measurement result of a distance measuring unit 13. The insertion completion distance is a movement distance of the holder 11 sufficient to insert all of the two connector terminals 52 whose tips are at the target point 522*a*, into the two terminal accommodation chambers 61. Then, when the measurement result reaches the insertion completion distance, the control unit 18 stops the movement of the holder 11 and ends an insertion process (step S13). A series of operations from the moving step of the holder 11 in the detection of the displacement amount g11 described above to step S13 in the inserting step corresponds to an example of the terminal inserting method.

According to the terminal insertion device 1 of the present embodiment described above, the terminal displacement amount detection device forming a part of the terminal insertion device 1, the terminal displacement amount detection method performed using the terminal insertion device 1, and the terminal insertion method, the following effects can be achieved.

That is, in the present embodiment, based on the movement distance of the holder 11 when the passage of the target point 522*a* is detected for the tip of each of the two connector terminals 52 for the tips of each of the two connector terminals 52, the displacement amount g11 between the tips of the two connector terminals 52 is acquired. Specifically, for example, the displacement amount g11 can be acquired by calculating the difference in the movement distance when the passage of the target point 522*a* is detected for each tip. As described above, according to the present embodiment, with respect to the two connector terminals 52, the displacement amount g11 between the tips can be grasped before the insertion. Then, when information I11 indicating that the displacement amount g11 has become less than the predetermined threshold value is acquired as a result of correction of the holding state by the holder 11 based on the displacement amount g11 thus grasped, the connector terminal 52 is inserted. Thereby, the two connector terminals 52 can be sufficiently inserted into the two terminal accommodation chambers 61.

Further, in the present embodiment, the passage of the target point 522*a* is detected because the tip of each of the two connector terminals 52 intercepts the two sensor lights 14*a* each passing through the target point 522*a* of the path 522 of each of the two connector terminals 52. Usage of such sensor light 14*a* enables the passage of each tip at target point 522*a* to easily and accurately be detected.

Further, in the present embodiment, the holder 111*b* in the holder 11 clamps the crimping portion 521 with the electrical wire 51 in each of the two connector terminals 52. By clamping in this manner, the connector terminal 52 can be suppressed in rolling and the like and be held in a more stable posture. This makes it possible to more accurately detect the passing of the target point 522*a* at each tip.

Moreover, in the present embodiment, the distance measuring unit 13 is the Magnescale (registered trademark) as a contact-type measuring instrument that measures the movement distance of the holder 11 by being pressed by the holder 11 as the holder 11 moves. In such a contact-type measuring device, the movement distance is measured directly, so that handling of data as the measurement result is easy, and the movement distance can be measured under good workability.

Further, in the present embodiment, the holder 11 moves linearly until the measurement result of the movement distance of the holder 11 reaches the insertion completion distance sufficient for inserting all of the two connector terminals 52 into the two terminal accommodation chambers 61, which is acquired in advance. Such simple insertion management allows the two connector terminals 52 to be sufficiently inserted into the plurality of terminal accommodation chambers 61 with high accuracy.

Further, in the present embodiment, the acquisition of the displacement amount g11 and determination as to whether or not the displacement amount g11 is less than the threshold are performed by the control unit 18, and the connector terminal 52 is automatically inserted under the control of the control unit 18 in the case less than the threshold. Since the work is performed almost automatically in this manner, the burden on the operator can be reduced and good workability can be acquired.

Here, as shown in FIG. 1, in the present embodiment, a pressure measurement unit 20 is provided which measures a load (N) required for the moving unit 12 to move the holder 11 as a pressure applied to the holder 11 during the movement of the holder 11. In the present embodiment, the pressure measurement is performed by the pressure measurement unit 20 during movement of the holder 11 in the insertion step of the connector terminal 52 shown in FIG. 4. The pressure applied to the holder 11 in this insertion step is equivalent to a repulsive force that the holder 11 receives from respective portions of the terminal holding chamber 61 via the connector terminal 52 when the connector terminal 52 is inserted into the terminal holding chamber 61. The measurement result in the pressure measurement unit 20 is sent to the control unit 18.

Moreover, in the terminal insertion device 1 of the present embodiment, the output unit 15 outputs the pressure measured by the pressure measurement unit 20 under the control of the control unit 18 in a possible format that the change of the pressure caused by the movement of the holder 11 can be confirmed. Specifically, the change in pressure with respect to the movement distance measured by the distance measurement unit 13 is displayed on the screen in the form of a graph. This screen display is displayed in real time while the holder 11 is moving. Further, with the end of the movement, the display contents up to that point are stored by the control unit 18, and the screen display later is also possible.

In the present embodiment, the following terminal insertion method is executed in the insertion step of FIG. 4 using the terminal insertion device 1 described above. Hereinafter, this terminal insertion method will be described again from the viewpoint of focusing on the pressure measurement by the pressure measurement unit 20.

In this terminal accommodation method, first, an accommodation process of simultaneously inserting two connector terminals 52 into two terminal accommodation chambers 61, a pressure measurement process, and a distance measurement process are performed.

The accommodation process is a process in which the operator operates the input unit 19 and the moving unit 12 moves the holder 11 in the traveling direction D11 linearly under the control of the control unit 18 which has received the operation. Thereby, the two connector terminals 52 are simultaneously inserted into and accommodated in the two terminal accommodation chambers 61. The pressure measurement step is a step in which the pressure measurement unit 20 measures the pressure applied to the holder 11 during the movement of the holder 11 in the accommodation process and sends the measurement result to the control unit 18 as described above. The distance measuring step is a step in which the distance measuring unit 13 measures the movement distance of the holder 11 during the movement of the holder 11 in the accommodation process and sends the measurement result to the control unit 18 as described above. In the control unit 18, the measurement result of the pressure measurement unit 20 and the measurement result of the distance measurement unit 13 are associated with each other for displaying a graph in the output unit 15. As described above, in the output unit 15, the change in pressure with respect to the movement distance measured by the distance measurement unit 13 is displayed in real time while the holder 11 is moving.

Here, as for the display content in the output unit 15, each stage of accommodation of the connector terminal 52 in the terminal accommodation chamber 61 and the change in pressure at that time will be described in association with each other. In the following, in order to simplify the description, it is assumed that one connector terminal 52 is accommodated in one terminal accommodating chamber 61.

Figure 5:
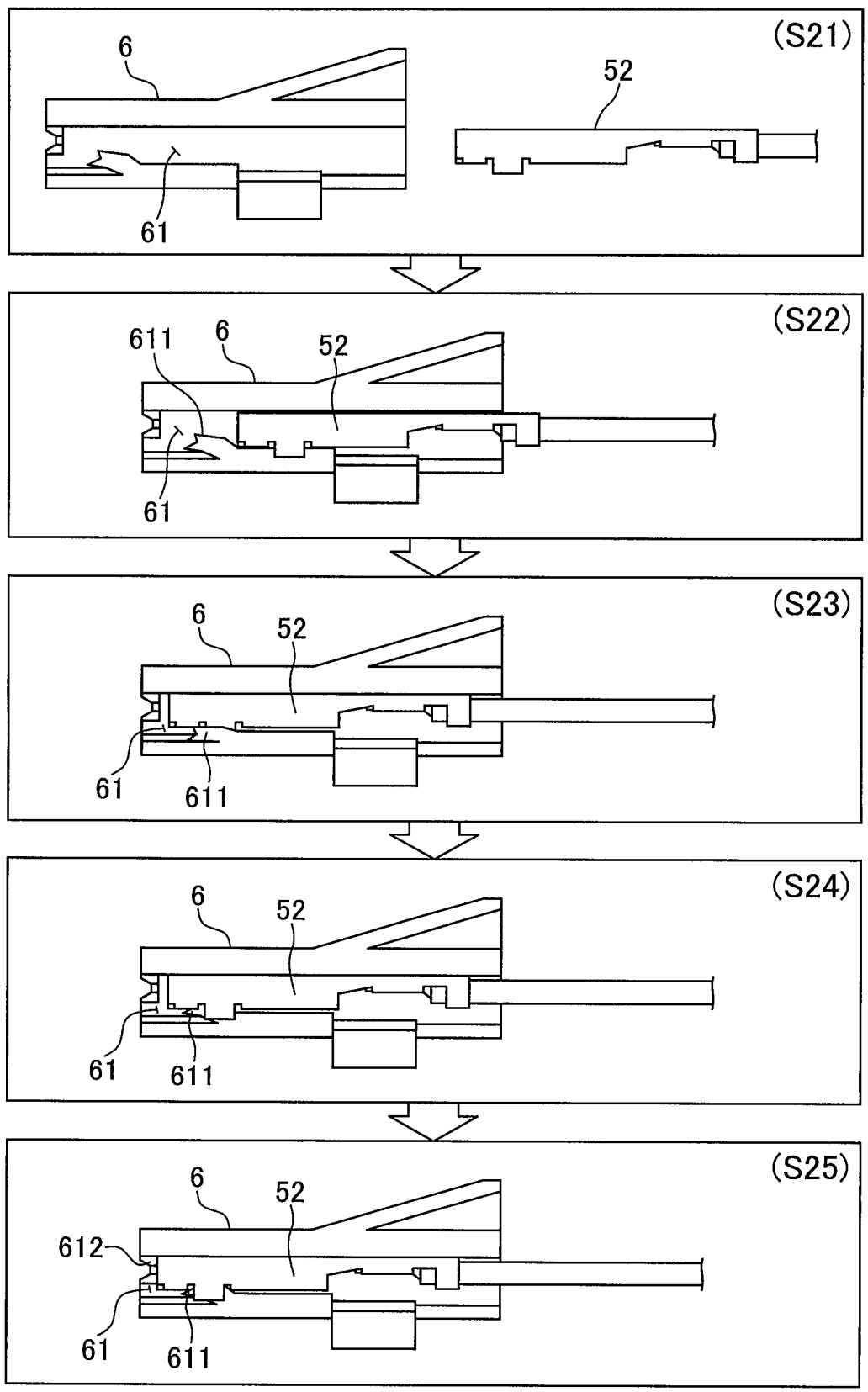
FIG. 5 is a schematic diagram dividing and showing a mode that one connector terminal is accommodated in one terminal accommodation chamber at each step of accommodation.
Figure 6:
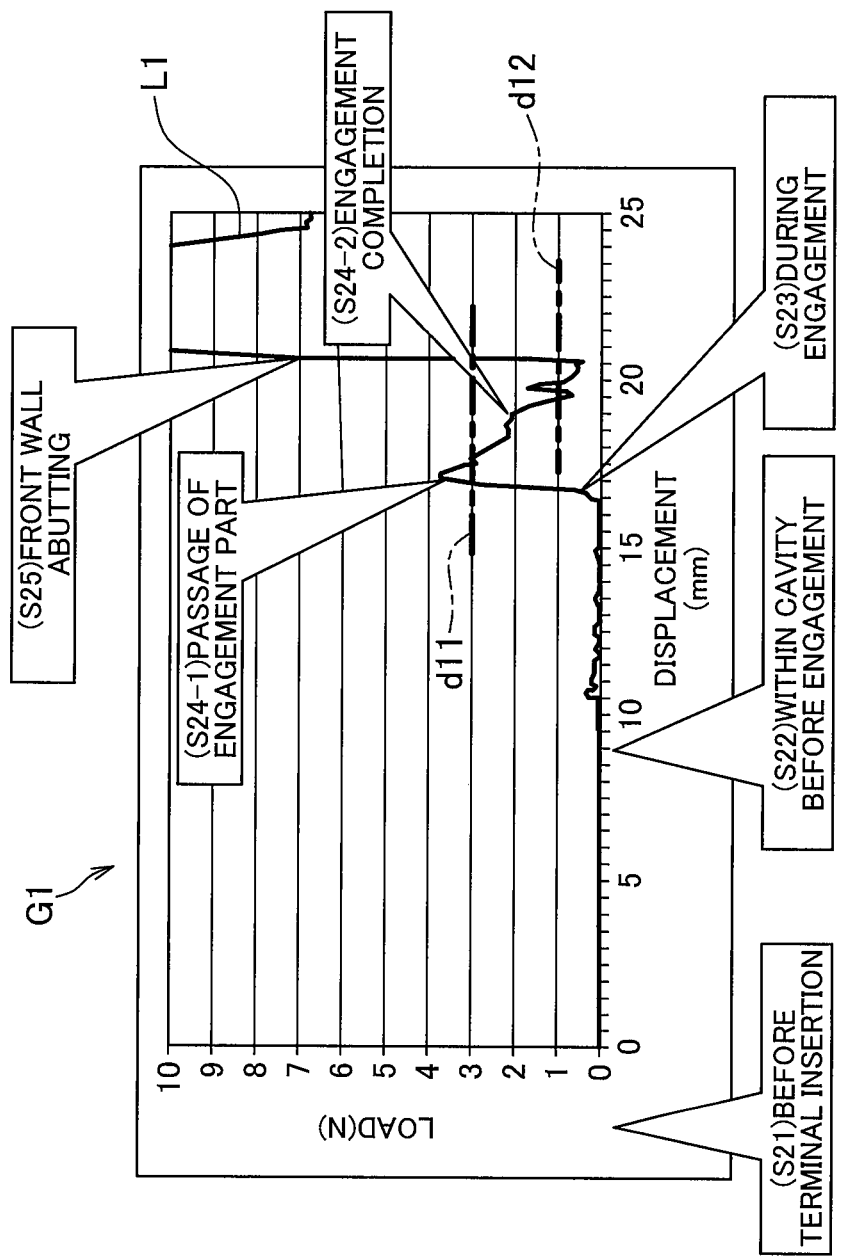
FIG. 6 is a graph showing an example of change of pressure to a movement distance of a holder, displayed when a connector terminal shown in FIG. 5 is accommodated.

FIG. 5 is a schematic diagram showing how one connector terminal is accommodated in one terminal accommodating chamber, divided into stages of accommodation. Moreover, FIG. 6 is a graph showing an example of the change of the pressure with respect to the movement distance of the holder displayed when the connector terminal shown by FIG. 5 is accommodated. In FIG. 5, the connector housing 6 and the connector terminal 52 are shown upside down from FIG. 1 and FIG. 4. In the graph G1 shown in FIG. 6, the horizontal axis represents the movement distance (mm) of the holder 11, and the vertical axis represents the pressure (N) applied to the holder 11. The change in pressure is indicated by a solid line L1 in the graph G1.

First, before the connector terminal 52 is inserted into the terminal accommodating chamber 61 of the connector housing 6 (step S21), as shown in the graph G1, the pressure applied to the holder 11 is substantially zero. This pressure state continues until the tip of the connector terminal 52 contacts a lance 611 inside the terminal accommodating chamber 61 (step S22).

The lance 611 is a cantilever-like locking portion, and when the insertion of the connector terminal 52 proceeds, the lance 611 is pushed by the connector terminal 52 and bent (step S23). The connector terminal 52 is provided with an approach hole for suppressing the return of the connector terminal 52 when the tip of the lance 611 enters. As the insertion of the connector terminal 52 proceeds, a tip of the lance 611 passes over the edge of the approach hole and moves back into the inside of the approach hole (step S24).

As shown in the graph G1 of FIG. 6, when the lance 611 is bent by being pushed by the tip of the connector terminal 52 at the stage of the step S23 to the step S24, the pressure rises sharply under the repulsive force from the lance 611. The timing at which the tip of the lance 611 enters the inside of the approach hole is the peak of the pressure change (S24-1), and when it passes, the pressure is reduced because the lance 611 is slightly released from bending. For a while after the peak, the edge of the approach hole of the connector terminal 52 passes over the lance 611, and the lance 611 gradually enters while being regressed. The pressure gradually decreases due to this regression. Eventually, when the edge of the approach hole of the connector terminal 52 passes over the lance 611, the regression of the lance 611 advances rapidly and entry into the approach hole is completed (S24-2).

Even after the tip of the lance 611 enters the approach hole, the connector terminal 52 advances slightly and stops when the tip abuts against a wall 612 on the back side of the terminal accommodation chamber 61 (step S25). Then, at the timing when the tip of the connector terminal 52 abuts against the wall 612 on the back side, the pressure is rapidly increased again by the repulsive force due to the abutment. This rapid rise continues until the control unit 18 causes the moving unit 12 to stop the movement of the holder 11.

Here, in the present embodiment, the accommodation determination step is performed in which the operator determines whether or not the connector terminal 52 is normally accommodated in the terminal accommodation chamber 61 based on the change in pressure displayed in the graph as described above.

In this accommodation determination step, it is determined whether or not the change in pressure measured in the pressure measurement step is the following normal change. The normal change means that after the pressure exceeds a first threshold value d11, the pressure becomes lower than a second threshold value d12 lower than the first threshold value d11, and then exceeds the first threshold value d11 again and the accommodation of the connector terminal 52 ends. The first threshold d11 is a threshold of pressure increase that occurs when the lance 611 enters the approach hole of the connector terminal 52. In the accommodation determination step, the first threshold value d11 is also used to confirm that the tip of the connector terminal 52 is in contact with the rear wall 612 of the terminal accommodation chamber 61. As described above, although the pressure decreases when the lance 611 enters the approach hole of the connector terminal 52, the second threshold d12 is a pressure value indicating that the lance 611 has sufficiently entered the approach hole.

As described above, the normal change described above is a pressure change that indicates that the connector terminal 52 has sufficiently entered the approach hole of the lance 611 and reached the back of the terminal accommodation chamber 61.

Here, in the present embodiment, the two connector terminals 52 are inserted into the two terminal accommodation chambers 61. Basically, even if the number of connector terminals 52 to be inserted is increased, the pressure change at the time of insertion, if there is no displacement between the tips of the connector terminals 52, is similar to the change in pressure when one connector terminal 52 is inserted as shown in FIG. 6.

Figure 7:
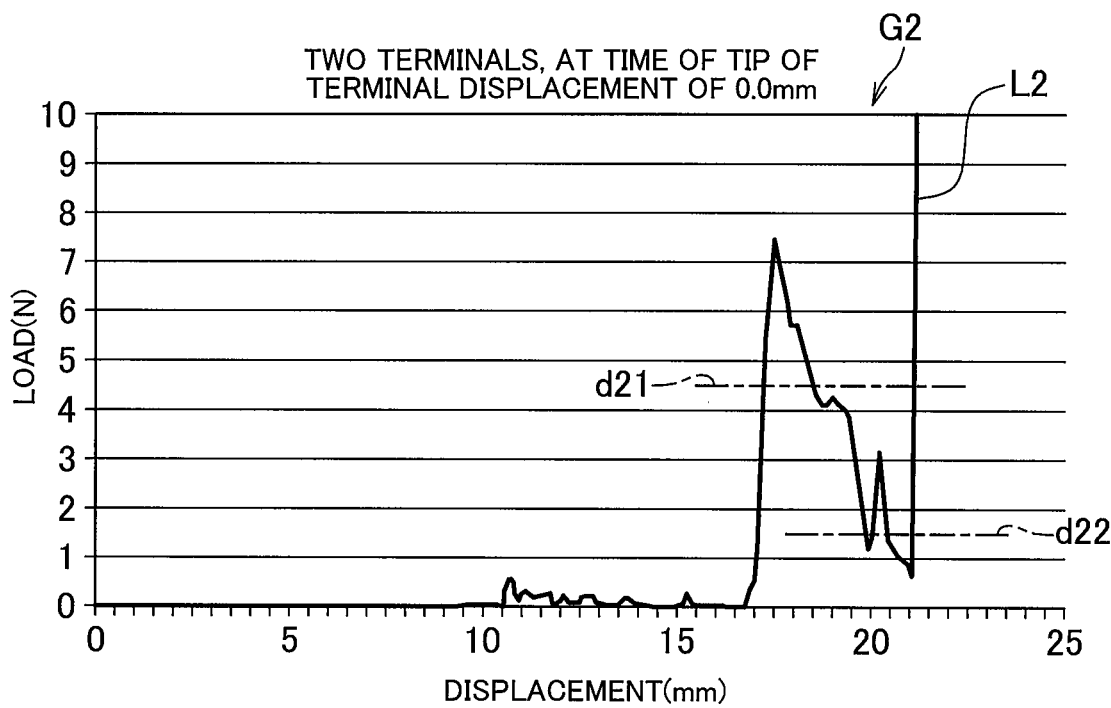
FIG. 7 is a graph showing an example of a pressure change when there is no displacement between tips of two connector terminals.

FIG. 7 is a graph showing an example of pressure change in the case where there is no displacement but lining-up between the tips of two connector terminals.

In the graph G2 shown in FIG. 7 as well, the movement distance of the holder 11 is taken along the horizontal axis, and the pressure applied to the holder 11 is taken along the vertical axis. And, a pressure change is shown by a solid line L2.

As indicated by the solid line L2 in the graph G2, when there is no displacement between the tips of the two connector terminals 52, the change in pressure is almost the same as the change in pressure during insertion of one connector terminal 52 shown in FIG. 6. That is, the tips of the two connector terminals 52 come in contact with the lances 611 of the two terminal accommodation chambers 61 substantially simultaneously, and the pressure rapidly rises and exceeds the first threshold value d21 and reaches a peak.

Eventually, the two lances 611 enter the approach holes of the two connector terminals 52 substantially at the same time, and the pressure decreases and becomes less than the second threshold value d22. Then, the tips of the two connector terminals 52 contact walls 612 on the back side of the two terminal accommodation chambers 61 at substantially the same time, and the pressure rapidly rises to exceed the first threshold value d21 and the insertion is completed.

Therefore, even in the present embodiment in which the two connector terminals 52 are inserted into the two terminal accommodation chambers 61, whether or not the change in pressure is the normal change can be judged by the accommodation determination process similar to the case of one connector terminal 52. Then, it can be determined whether or not the two connector terminals 52 are normally accommodated in the terminal accommodation chamber 61 based on the determination result.

At this time, if the displacement occurs between the tips of the two connector terminals 52, the change in pressure deviates from the normal change shown in FIG. 7 as follows according to the degree of the displacement. That is, when the displacement occurs, the timing at which the lance 611 enters the approach hole of each connector terminal 52 is displaced between the two connector terminals 52. Since a peak appears in the change in pressure at the timing when the lance 611 enters the approach hole, when the displacement occurs, the displacement occurs in the appearance position of the peak between the two connector terminals 52. The positional displacement of the peak increases as the displacement between the tips of the two connector terminals 52 increases.

Figure 8:
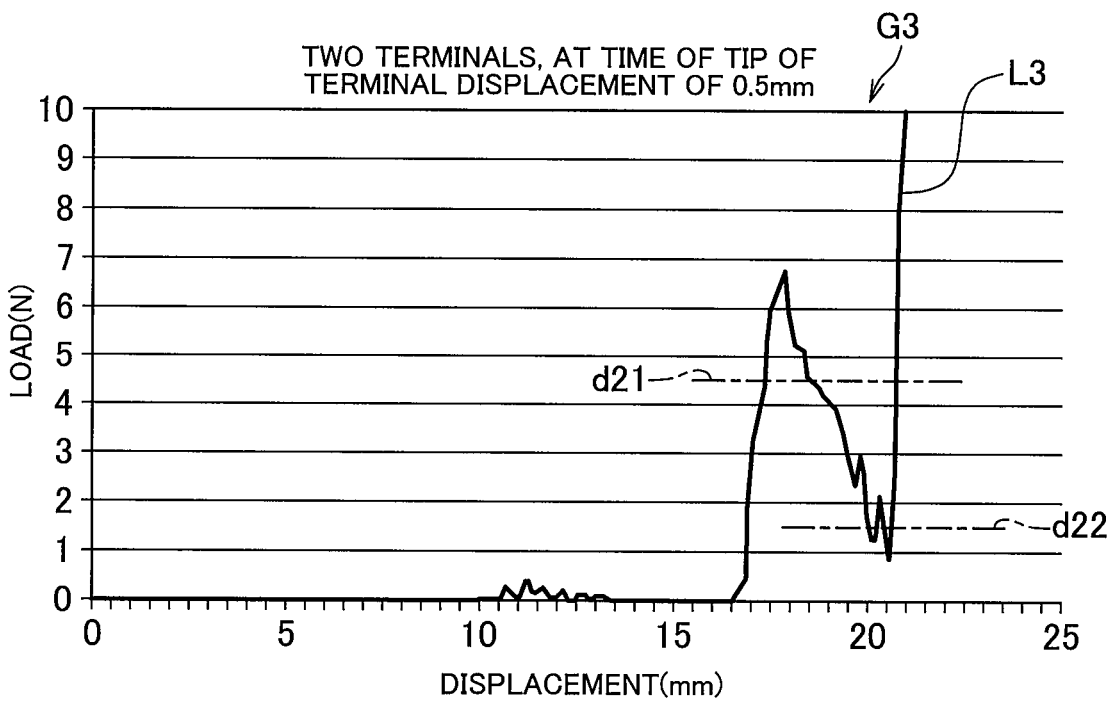
FIG. 8 is a graph showing an example of a pressure change when a displacement of about 0.5 (mm) has arisen between the tips of two connector terminals.
Figure 9:
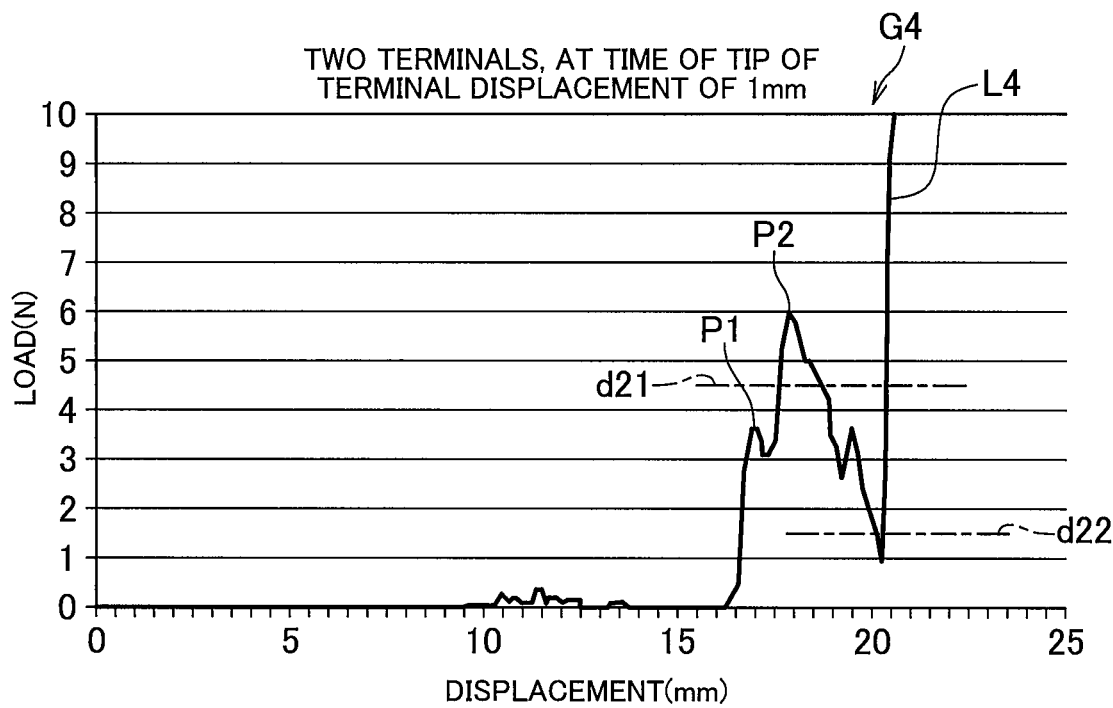
FIG. 9 is a graph showing an example of a pressure change when a displacement of about 1.0 (mm) has arisen between tips of two connector terminals.

FIG. 8 is a graph showing an example of pressure change in the case where the displacement of about 0.5 (mm) occurs between the tips of two connector terminals, and FIG. 9 is a graph showing an example of a pressure change when the displacement of about 1.0 (mm) has arisen between the tips of the two connector terminals.

In the graph G3 shown in FIG. 8 as well, the movement distance of the holder 11 is taken along the horizontal axis, the pressure applied to the holder 11 is taken along the vertical axis, and the pressure change is shown by the solid line L3. Similarly, in the graph G4 shown in FIG. 9, the horizontal axis represents the movement distance of the holder 11, the vertical axis represents the pressure applied to the holder 11, and the pressure change is indicated by the solid line L4.

In the example of FIG. 8, as indicated by the solid line L3 in the graph G3, when the displacement between the tips of the two connector terminals 52 is about 0.5 (mm), the timing of the lance 611 to enter the approach hole of the terminal 52 does not deviate so much. For this reason, the change of the measured pressure is also a change which is not so different from the normal change shown in FIG. 7. That is, even in the example of FIG. 8, the change in pressure is the normal change, and it is determined that the two connector terminals 52 are normally accommodated in the terminal accommodation chamber 61. In addition, when the displacement between the tips is as small as this degree, since there is almost no displacement in the peak that appears due to the approach of the lance 611 into the approach hole, it is determined that no displacement has occurred so substantially between the tips.

On the other hand, in the example of FIG. 9, as indicated by the solid line L4 in the graph G4, when the displacement between the tips of the two connector terminals 52 is about 1.0 (mm), the displacement of the peak becomes clear. That is, the first peak P1 appears at the timing when the lance 611 enters the approach hole of the preceding connector terminal 52, and the second peak P2 appears at the timing when the lance 611 enters the approach hole of the next connector terminal 52.

However, in the example of FIG. 9, even if two peaks appear, the change in pressure exceeds the first threshold d21 and then becomes less than the second threshold d22 and then exceeds the first threshold d21 again, and it can be said that it is still within the range of normal change. This change means that even if there is the displacement in timing, for any of the two connector terminals 52, the tip of each connector terminal 52 has reached the back wall 612 of the terminal accommodation chamber 61 after the lance 611 sufficiently achieves entry into the approach hole. On the other hand, with regard to the peaks that appear due to the entry of the lance 611 into the approach hole, two clearly visible first peaks P1 and second peaks P2 appear. For this reason, in the example of FIG. 9, it is determined that there is the displacement between the tips of the two connector terminals 52. However, as described above, in the example of FIG. 9, although the displacement between the tips is judged from the appearance of two peaks, the change in pressure is the normal change as described above, and two connector terminals 52 are determined to be accommodated in the terminal accommodation chamber 61 normally.

However, if the displacement between the tips of the two connector terminals 52 is further increased, the following situation may occur. That is, there may be situations that the tip of the connector terminal 52, in which the lance 611 has entered the approach hole, contacts the back wall 612 of the terminal accommodation chamber 61 before the lance 611 has fully entered the approach hole of the subsequent connector terminal 52. In this case, the locking of the lance 611 is insufficient for the subsequent connector terminals 52, and the accommodation in the terminal accommodation chamber 61 is not normal. In the present embodiment, it is found that the accommodation in the terminal accommodation chamber 61 is not normal as described below in the accommodation determination process.

Figure 10:
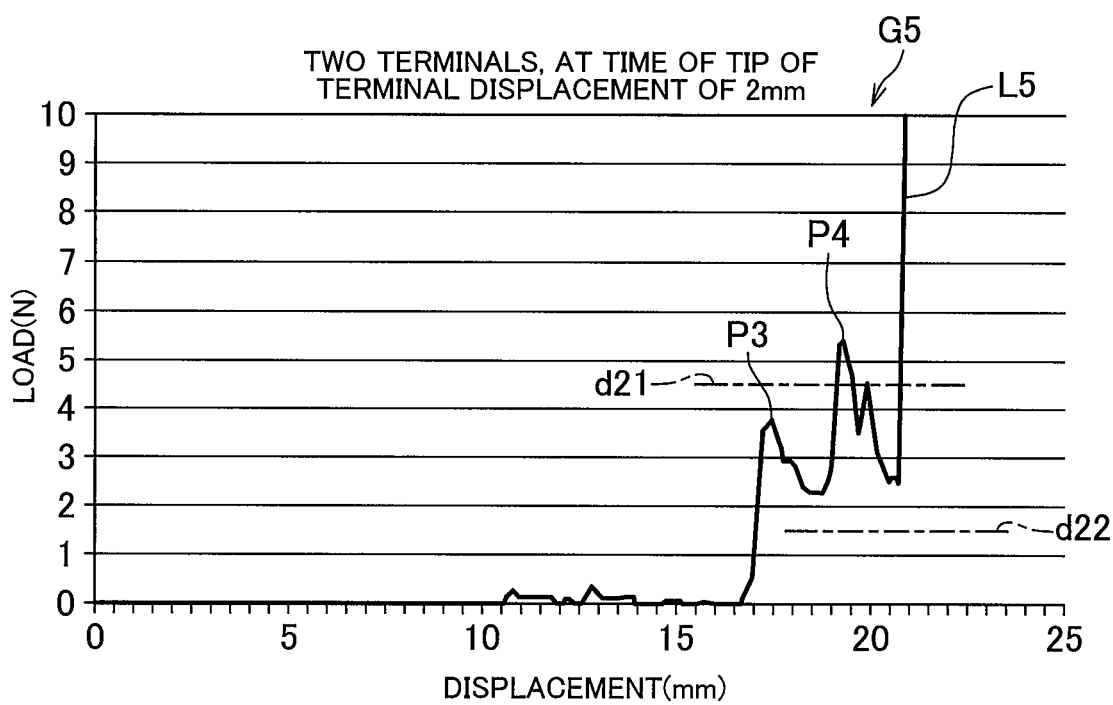
FIG. 10 is a graph showing an example of a pressure change when a displacement of about 2.0 (mm) has arisen between tips of two connector terminals.

FIG. 10 is a graph showing an example of a pressure change in the case where the displacement of about 2.0 (mm) occurs between the tips of two connector terminals.

In the graph G5 shown in FIG. 10, the movement distance of the holder 11 is taken along the horizontal axis, the pressure applied to the holder 11 is taken along the vertical axis, and the pressure change is shown by the solid line L5.

In the example of FIG. 10, as indicated by the solid line L5 in the graph G5, the first peak P3 and the second peak P4 occur in the change in pressure, and the tips of the two connector terminals 52 are determined to deviate from each other. Furthermore, the change in pressure exceeds the first threshold d21 and before it becomes less than the second threshold d22, it exceeds the first threshold d21 again, and it is determined that the change is not a normal change. As described above, this change represents that the tip of the preceding connector terminal 52 abuts against the back wall 612 of the terminal accommodating chamber 61 before the lance 611 sufficiently enters the approach hole of the subsequent connector terminal 52. That is, in the example of FIG. 10, it is determined that the displacement between the tips is determined from the appearance of the two peaks, and that the two connector terminals 52 are not properly accommodated in the terminal accommodation chamber 61.

In the present embodiment, as an example of the accommodation determination step, an embodiment is exemplified in which the two connector terminals 52 are accommodated and it is determined whether or not the two connector terminals 52 are properly accommodated. However, in the accommodation determination step, as described with reference to FIG. 6, even if there is only one connector terminal 52, it can be determined whether or not the accommodation has been properly performed. Further, even if the number of connector terminals 52 is three or more, it can be determined whether or not their accommodation has been properly performed.

Figure 11:
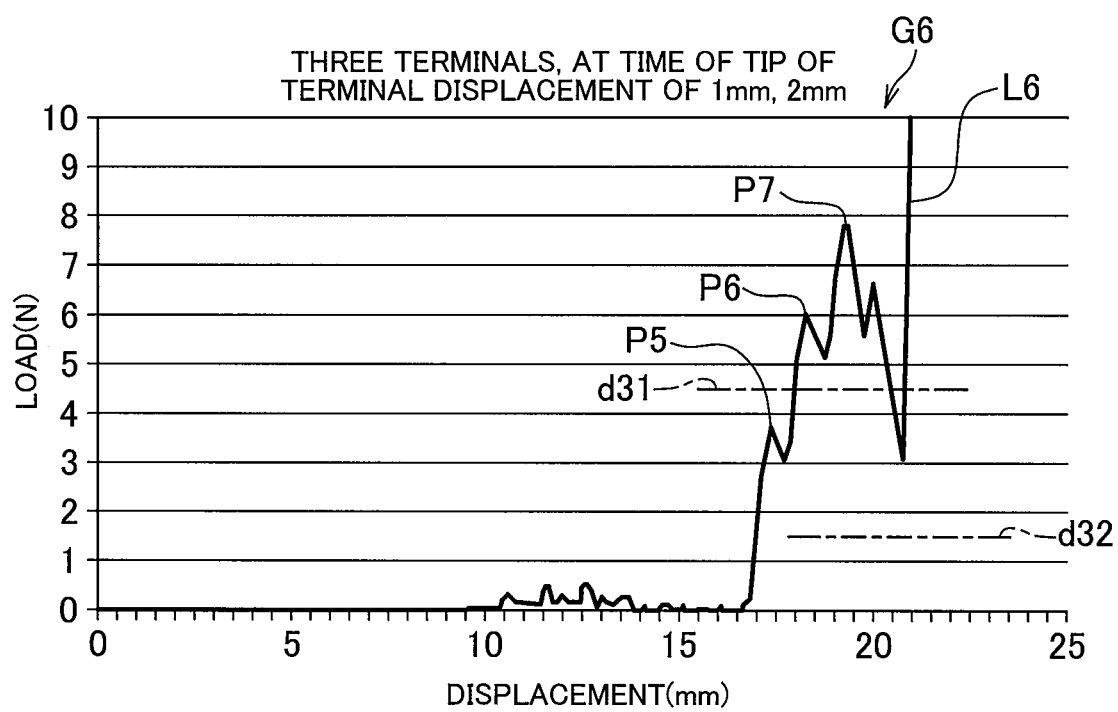
FIG. 11 is a view explaining an accommodation judgment process at the time of taking an accommodation of three connector terminals as an example that the number of connector terminals is three or more.

FIG. 11 illustrates accommodation of three connector terminals as an example in which the number of connector terminals is three or more, and illustrates the accommodation determination process at that time. FIG. 11 shows a graph G6 of an example of a pressure change when two types of displacement of about 1.0 (mm) and about 2.0 (mm) are generated between the tips of three connector terminals 52.

In the graph G6 shown in FIG. 11 as well, the movement distance of the holder 11 is taken along the horizontal axis, the pressure applied to the holder 11 is taken along the vertical axis, and the pressure change is indicated by the solid line L6.

In the example of FIG. 11, as indicated by the solid line L6 in the graph G6, the displacement is generated between the tips of the three connector terminals 52, so that three peaks of the first peak P5, the second peak P6 and third peak P7 appear. Since the displacement is large, the tip of the preceding connector terminal 52 is in contact with the back wall 612 of the terminal accommodating chamber 61 before the lance 611 sufficiently enters the subsequent connector terminal 52 in the example of FIG. 1. In response to this, the change in pressure represented by the solid line L6 exceeds the first threshold d31 and then again exceeds the first threshold d31 before becoming less than the second threshold d32, and is not determined to be a normal change. That is, in the example of FIG. 11, it is determined that the displacement between the tips is determined from the appearance of the three peaks, and that the three connector terminals 52 are not properly accommodated in the terminal accommodation chamber 61.

In the terminal insertion method according to the present embodiment described above, it is determined whether or not the connector terminal 52 has been accommodated normally into the terminal accommodating chamber 61 based on the change in pressure applied to the holder 11 holding the connector terminal 52 during insertion of the connector terminal 52. For this reason, with respect to the connector terminals 52 determined to be properly accommodated in this determination, sufficient insertion is ensured without performing a tensile test or the like on each of the connector terminals 52 thereafter. Then, the above determination is performed regardless of the length (under-neck length) of the electrical wire exposed between the connector terminal 52 held by the holder 11 and the outermost covering portion 53. When the length of the neck is short, a stroke for performing a tensile test cannot be secured, which may make it difficult to ensure insertion by the tensile test. However, according to the terminal insertion method of the present embodiment, sufficient insertion of the connector terminal 52 can be ensured regardless of the length of the neck of the electrical wire 51 to which the connector terminal 52 is crimped and connected.

Further, in the terminal insertion method of the present embodiment, presence or absence of a displacement between the tips of the two connector terminals 52 is also determined based on a shape of the change in pressure applied to the holder 11 during the simultaneous insertion of the two connector terminals 52. Such displacement may be due to the insertion failure of the plurality of connector terminals 52 as described with reference to FIG. 10 or as described for another example in which the number of connector terminals 52 is three with reference to FIG. 11. According to the terminal insertion method of the present embodiment, sufficient insertion of the plurality of connector terminals 52 can be ensured, including the presence or absence of such an occurrence cause.

Further, in the terminal insertion method according to the present embodiment, the distance measurement step of measuring the movement distance of the holder 11 by the distance measuring unit 13 is performed while the holder 11 is moved in the accommodation step. In the accommodation determination step, as described with reference to FIGS. 6 to 11, the determination is based on the change in pressure with respect to the movement distance. The movement distance of the holder 11 indicates which position the connector terminal 52 during insertion lies in, in relative to the terminal accommodating chamber 61. According to the terminal insertion method of the present embodiment, if an insertion failure occurs temporarily, it can also be determined at which location in the terminal accommodating chamber 61 the insertion failure has occurred.

Further, in the terminal insertion method of the present embodiment, Magnescale (registered trademark) is adopted as the contact type measuring instrument measuring the movement distance of the holder 11 by being pressed by the projection 112 which is a part of the holder 11. In such a contact-type measuring device, the movement distance is measured directly, so that handling of data as the measurement result is easy, and the movement distance can be measured under good workability.

Moreover, according to the terminal insertion device 1 of the present embodiment used for such a terminal insertion method, the pressure applied to the holder 11 holding the connector terminal 52 is outputted in the form of graph in which a change due to the movement of the holder 11 can be confirmed. Thus, based on the output pressure, it is possible to determine whether the connector terminal 52 is normally accommodated in the terminal accommodation chamber 61 based on the above-described determination using the two thresholds. Such an operation is performed regardless of the under-neck length of the electrical wire 51 to which the connector terminal 52 held by the holder 11 is crimped and connected as described above. Therefore, according to the terminal insertion device 1 of the present embodiment, sufficient insertion of the connector terminal 52 can be ensured regardless of the under-neck length of the electrical wire 51 to which the connector terminal 52 is crimped and connected.

Further, according to the terminal insertion device 1 of the present embodiment, the two connector terminals 52 can be inserted simultaneously, and the sufficient insertion of the connector terminals 52 is ensured to the two connector terminals 52 as described above.

Further, in the terminal insertion device 1 of the present embodiment, the output unit 15 outputs the change in the pressure with respect to the movement distance of the holder 11 that can be confirmed in the form of a graph. Thus, as described above, when an insertion failure occurs, it can be determined at which location in the terminal accommodating chamber 61 the insertion failure of the connector terminal 52 has occurred.

Further, in the terminal insertion device 1 of the present embodiment, Magne scale (registered trademark) is adopted in the distance measurement unit 13 as a contact-type measuring instrument. This makes it possible to measure the movement distance with good workability as described above.

The embodiments described above show only typical forms of the present invention, and the present invention is not limited to these embodiments. That is, various modifications can be made without departing from the scope of the present invention. As long as the modifications include the configurations of the terminal displacement amount detection method, the terminal insertion method, the terminal displacement amount detection device, and the terminal insertion device according to the present invention, they are of course included in the scope of the present invention.

For example, in the embodiment described above, the form is illustrated that the control unit 18 automatically performs acquisition of the displacement amount g11 and determination as to whether the displacement amount g11 is less than the threshold. However, the acquisition of the displacement amount g11 or the above determination may be made by the operator instead calculating based on, for example, the movement distance displayed on the output unit 15.

Further, in the above-described embodiment and another example, two connector terminals 52 crimp-connected to the respective end portions of the two electrical wires 51 in the two-core twisted cable 5 are illustrated as an example of the plurality of connector terminals according to the present invention. However, the plurality of connector terminals according to the present invention is not limited to this, and the specific number of the connector terminals does not matter.

In the embodiment and the other examples described above, the optical passage detection unit 14 including the light emitting unit 141 and the light receiving unit 142 is illustrated as an example of the passage detection unit according to the present invention. However, the passage detection unit according to the present invention is not limited to these, and may use, for example, a method other than the optical method such as detecting the contact pressure of the tip of the connector terminal.

In the above-described embodiment and another example, the configuration is illustrated that the holder 11 is moved by the moving unit 12 having the motor under the control of the control unit 18. However, the present invention is not limited thereto, and a moving unit having a manual moving mechanism is provided, and the operator manually linearly moves the holder by operating the moving unit manually by, for example, a handle operation.

In the embodiment described above, the distance measuring unit 13 employing Magnescale (registered trademark) attached to the housing holder 16 is illustrated as an example of the distance measuring unit according to the present invention. However, the distance measuring unit according to the present invention is not limited to this, but the one using the Magnescale (registered trademark) attached to the holder of the connector terminal with the tip of the linearly portion pointing the housing holder. In this case, the housing holder is disposed forward of the moving direction of the holder, and corresponds to an example of an object that presses Magnescale (registered trademark) as a measuring instrument.

Further, the distance measuring unit referred to in the present invention is not limited to the Magnescale (registered trademark), for example, but may be a dial gauge or the like mechanically extending the linear movement of a spindle with a gear, turning the pointer and indicating the movement distance of the spindle with the pointer. Even in the case of using the dial gauge, the installation location may be the holder of the connector terminal or the housing holder.

Further, the distance measuring unit according to the present invention is not limited to the contact type measuring instrument such as Magnescale (registered trademark) or the dial gauge. The distance measuring unit referred to in the present invention may be, for example, a non-contact type measuring device which measures the distance to the object by applying ultrasonic waves or laser light to the object and detecting the reflection thereof. Also in this case, the measuring instrument may be provided in the holder of the connector terminal with the housing holder as the object, or the measuring device may be provided in the housing holder with the holder of the connector terminal as the object. Further, the distance measuring unit according to the present invention may be a photographing system or the like that shoots the movement of the holder with the photographing device disposed apart from the holder of the connector terminal and the housing holder, and acquires the movement distance of the holder by image analysis on the photographed image.

In the embodiment described above, the form is illustrated that when inserting the connector terminal 52, the insertion completion distance acquired in advance in the design stage is used as it is, and the holder 11 is moved linearly until the movement distance of the holder 11 reaches the insertion completion distance. However, the movement control for the holder 11 is not limited to this. For example, the insertion completion distance may be corrected based on the displacement amount g11 which has become less than the threshold, and the movement control with respect to the holder 11 may be performed using the corrected insertion completion distance. Specifically, movement control based on the following correction may be mentioned. In the embodiment described above, the movement of the holder 11 related to the terminal insertion starts from the position where the subsequent connector terminal 52 reaches the target point 522a, so if the insertion completion distance is used as it is, the preceding connector terminal 52 is within the allowable range or tends to be somewhat over inserted. Therefore, for example, correction may be performed by subtracting the half value of the displacement amount g11 from the insertion completion distance, and movement control for the holder 11 may be performed using the corrected insertion completion distance. Thereby, it is possible to suppress excessive insertion of the preceding connector terminal 52 while suppressing the insufficient insertion of the subsequent connector terminal 52. In this case, the corrected insertion completion distance corresponds to an example of the "predetermined" insertion completion distance according to the present invention. Here, "predetermined" includes any timing up to the start of insertion of the connector terminal 52, whether at the design stage or at the correction stage immediately before the start.

REFERENCE SIGNS LIST

1 terminal insertion device
5 twist cable
6 connector housing
11 holder
12 moving unit
13 distance measuring unit
14 passage detection unit
14a sensor light
15 output unit 16 housing holder
16a insertion port
17 wire color detection unit
18 control unit
19 input unit
20 pressure measurement unit
51 electrical wire
52 connector terminal
53 outermost covering part
61 terminal accommodation chamber
111 holding plate
111a holding groove
111b holding part
131 straight part
132 receiving part
141 light emitting part
142 light receiving part
521 crimping portion
522 passage
522a target point
611 lance
612 wall
d11, d21, d31 first threshold
d12, d22, d32 second threshold
g11 displacement amount
D11 traveling direction
D12 arrow
D13 arrangement direction
D14 direction
I11 information
P1, P3, P5 first peak
P2, P4, P6 second peak
P7 third peak

What is claimed is:

1. A terminal displacement amount detection method comprising the steps of:
    a moving step of moving linearly a holder holding parallel to one another in a single row a plurality of connector terminals each of which is crimped and connected to an end portion of an electrical wire, while measuring a movement distance of the holder with prespective tips of each of the plurality of connector terminals pointing in a traveling direction;
    a passage detection step of detecting respective passages of the respective tips of each of the plurality of connector terminals at a respective target points on respective paths, the respective target points coinciding with each other in a side view when the respective paths of each of the plurality of connector terminals is viewed in an arrangement direction of the plurality of connector terminals; and
    a displacement amount acquiring step of acquiring a displacement amount between the respective tips of each of the plurality of connector terminals based on the movement distance when the respective passages are detected for the respective tips of each of the plurality of connector terminals.

2. The terminal displacement amount detection method according to claim 1, wherein
    the passage detection step is a step of detecting the respective passages when each of the respective tips of the plurality of connector terminals intercepts a respective sensor light of a plurality of sensor lights passing through the respective target points on the respective paths of each of the plurality of connector terminals.

3. The terminal displacement amount detection method according to claim 1, wherein
    the measurement of the movement distance is performed using a contact-typed measuring instrument of measuring the movement distance of the holder by being pressed by the holder or an object disposed forward of a moving direction of the holder as the holder moves.

4. The terminal displacement amount detection method according to claim 2, wherein
    the measurement of the movement distance is performed using a contact-typed measuring instrument of measuring the movement distance of the holder by being pressed by the holder or an object disposed forward of a moving direction of the holder as the holder moves.

5. A terminal insertion method; comprising the steps of:
    a moving step of moving linearly a holder holding parallel to one another in a single row a plurality of connector terminals each of which is crimped and connected to an end portion of an electrical wire while measuring a movement distance of the holder with prespective tips of each of the plurality of connector terminals pointing in a traveling direction;
    a passage detection step of detecting respective passages of the respective tips of each of the plurality of connector terminals at respective target points on respective paths, the respective target points coinciding with each other in a side view when the respective paths of each of the plurality of connector terminals is viewed in an arrangement direction of the plurality of connector terminals;
    a displacement amount acquiring step of acquiring a displacement amount between the respective tips of each of the plurality of connector terminals based on the movement distance when the respective passages are detected for the respective tips of each of the plurality of connector terminals; and
    an insertion step of further moving linearly the holder when the displacement amount is less than a predetermined threshold so as to simultaneously insert the plurality of connector terminals into a plurality of terminal accommodation chambers of a connector housing, the connector housing being disposed such that the plurality of terminal accommodation chambers is positioned one to one along the respective paths of each of the plurality of connector terminals.

6. The terminal insertion method according to claim 5, wherein
    the insertion step is a step of while measuring the movement distance, moving linearly the holder until the measurement result reaches an insertion completion distance acquired in advance sufficient to insert all of the plurality of connector terminals into the plurality of terminal accommodation chambers.

7. The terminal insertion method according to claim 6, wherein
    the insertion completion distance is a movement distance of the holder sufficient to insert into the plurality of terminal accommodation chambers all of the plurality of connector terminals whose respective tips are located at the respective target points, and the insertion step is a step of, when the displacement amount less than the threshold is acquired, moving linearly the holder until the movement distance from a zero position reaches the insertion completion distance, and wherein
    the zero position is set a position of the holder when a passage of any one of the respective tips of the plurality of connector terminals is detected.

8. The terminal insertion method according to claim 5, wherein the connector housing is held by a housing holder arranged forward in the traveling direction of the holder, and the measurement of the movement distance is performed using a contact-typed measuring instrument of measuring the movement distance of the holder by being pressed by the holder or the housing holder as the holder moves.

9. The terminal insertion method according to claim 6, wherein the connector housing is held by a housing holder arranged forward in the traveling direction of the holder, and the measurement of the movement distance is performed using a contact-typed measuring instrument of measuring the movement distance of the holder by being pressed by the holder or the housing holder as the holder moves.

10. The terminal insertion method according to claim 7, wherein the connector housing is held by a housing holder arranged forward in the traveling direction of the holder, and the measurement of the movement distance is performed using a contact-typed measuring instrument of measuring the movement distance of the holder by being pressed by the holder or the housing holder as the holder moves.

\* \* \* \* \*